(12) United States Patent
Kim-Morgan

(10) Patent No.: US 12,028,580 B2
(45) Date of Patent: Jul. 2, 2024

(54) SYSTEM FOR SOCIALIZED CONTENT SHARING

(71) Applicant: Boon Do Kim-Morgan, Henderson, NV (US)

(72) Inventor: Boon Do Kim-Morgan, Henderson, NV (US)

( * ) Notice: Subject to any disclaimer, the term of this patent is extended or adjusted under 35 U.S.C. 154(b) by 0 days.

(21) Appl. No.: 17/972,237

(22) Filed: Oct. 24, 2022

(65) Prior Publication Data

US 2023/0058862 A1   Feb. 23, 2023

(51) Int. Cl.
*H04N 21/4788* (2011.01)
*G06Q 50/00* (2012.01)
*H04N 21/858* (2011.01)

(52) U.S. Cl.
CPC ......... *H04N 21/4788* (2013.01); *G06Q 50/01* (2013.01); *H04N 21/858* (2013.01)

(58) Field of Classification Search
None
See application file for complete search history.

(56) References Cited

U.S. PATENT DOCUMENTS

2012/0030587 A1* 2/2012 Ketkar ............... H04N 21/47
715/751

* cited by examiner

*Primary Examiner* — Omar S Parra
(74) *Attorney, Agent, or Firm* — Pasadena Legal Group; Norman R. Van Treeck

(57) ABSTRACT

A system for socialized multimedia content sharing having a sending device used by a user. One or more than one link to multimedia content stored in a storage operably. Instructions operable on the sending device for: displaying a list of the one or more than one link stored in the storage; selecting one or more than one link from the displayed list; displaying a list of the one or more than one recipients; selecting one or more recipient to transmit the one or more than one link; transmitting the one or more than one link to the one or more than one selected recipient; and displaying one or more than one linked multimedia content from the storage to the recipient.

18 Claims, 2 Drawing Sheets

SYSTEM FOR SOCIALIZED CONTENT SHARING

CROSS-REFERENCE TO RELATED APPLICATIONS

This Application claims the benefit under 35 U.S.C. § 119(e) of U.S. Provisional Patent Application Ser. No. 63/235,219, filed on 2021 Aug. 20, the contents of which are incorporated herein by reference in their entirety.

FIELD OF THE INVENTION

The present invention is in the technical field of content sharing and more particularly to a system for socialized media content sharing.

BACKGROUND

There are billions of streaming users around the world. Each user has multiple streaming platforms that they subscribe to, both free and paid. Additionally, many of these users have a digital video recorder (DVR) or a standard video cassette recorder (VCR). Every use can, in some manner, record content from various providers. However, sharing of that content is currently not possible or severely limited. When a user wants to share a recorded program or other media content with a friend or relative, they currently need to either upload the content or copy the content to a medium and deliver it to the other user.

Disadvantageously, converting, uploading and sharing content is problematic at best and the results for the average user are poor. Additionally, most streaming content can only be shared by a web link in a message, or casually leaving the name of the show to the receiving user without a good way of finding the content, or not being able to watch it on a service that they are not subscribed to.

Therefore, there is a need for a system for socialized media content sharing, overcoming the limitations of the prior art.

SUMMARY

The present invention overcomes the limitations of the prior art by providing a system for socialized media content sharing. The system comprises a sending device used by a user, one or more than one link to multimedia content stored in a storage operably connected to the sending device, instructions operable on the sending device for displaying a list of the one or more than one link stored in the storage, selecting one or more than one link from the displayed list, displaying a list of the one or more than one recipients, selecting one or more recipient to transmit the one or more than one link, transmitting the one or more than one link to the one or more than one selected recipient, and displaying one or more than one linked multimedia content from the storage to the recipient.

The sending device is selected from the group consisting of a smart phone, s computer, a digital video recorder, a cloud digital video recorder, a cloud storage, a tablet, or a smart device connected to the Internet. The sending device is connected to the Internet and can accept instructions from a remote application for operating the sending device by a remote user.

The one or more than one link is selected from a list that the sender has populated or received from one or more than one different sending device. The sender wants to share particular content with another, the receiver, the sender selects the multimedia content, then the sender selects one or more than one receiver to allow access to the content. Transmitting the link to the selected recipient is performed using a social media platform, or an electronic communications platform.

The one or more than one link stored in the storage can b an event recorded by the user on a digital video recorder, event recorded by the user from a paid streaming source, or an event from a paid streaming account associated with the user. If the recipient that do not subscribe to a streaming service or other content providers offerings, the recipient is authorized a trial subscription to the service to watch the received content. The system also has instructions for automatically uploading the multimedia content video from the DVR could automatically be to a secure cloud based storage and viewed from that location.

There is also provided a method for using a system for socialized media content sharing. First, logging into a sending account. Then, accessioning multimedia content to share. Next, selecting one or more than one piece of multimedia content to share. Then, selecting one or more than one receiver is selected from a contact list stored in the sending account. Next, determining if the receiver is a subscriber to the selected multimedia content service or if the multimedia content is available for free. Finally, viewing the multimedia content by the recipient. The method also sends a link to the multimedia content if the receiver is a subscriber to the service containing the multimedia content, or sending a link to the actual multimedia content if the multimedia content is freely available. The method also automatically modifies the link to support a trial to the subscription service with any special offers for the receiver, if the receive is not a subscriber. The sender can be incentivizing by the subscription service, if the receiver subscribes to the service, monetarily or using other incentives. Advertisements can also be displayed prior to playing the linked content. The revenue from the displayed advertisements can be split with the sender as a further incentive. The method can also send a video clip instead of the entire multimedia content, block a receiver from receiving one or more than one link, create a QR code to upload a receiver's information to be used, and display advertisements prior to playing one one or more than one multimedia content.

BRIEF DESCRIPTION OF THE DRAWINGS

The present invention overcomes the limitations of the prior art by providing a system for socialized media content sharing.

These and other features, aspects and advantages of the present invention will become better understood with regard to the following description, appended claims, and accompanying figures where:

DETAILED DESCRIPTION OF THE INVENTION

Figure 1:
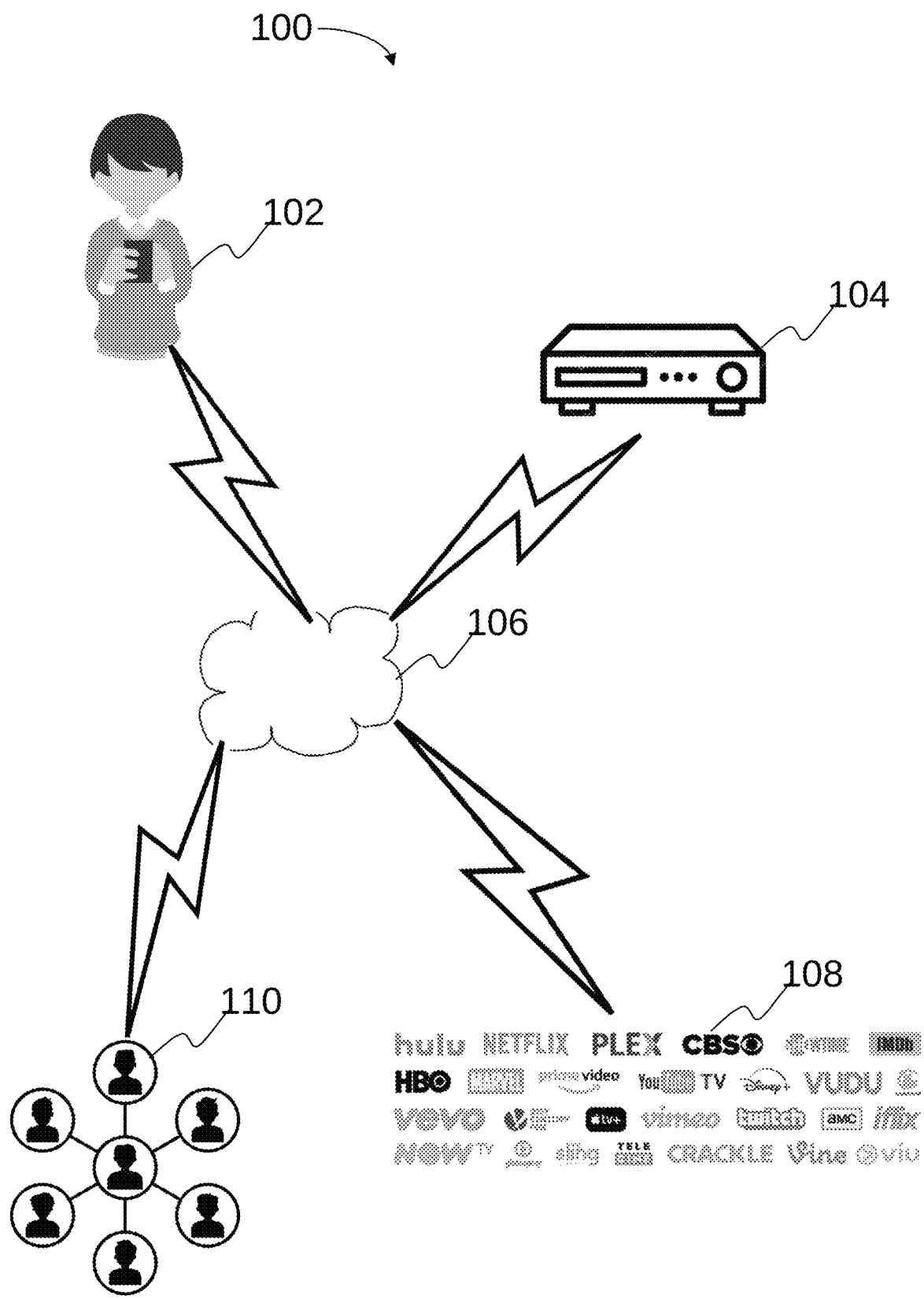
FIG. 1 is a diagram of a system for socialized media content sharing, according to one embodiment of the present invention.

The present invention overcomes the limitations of the prior art by providing a system for socialized media content sharing. The present invention allows a user to directly share videos from their DVR/VCR to other users without the need to copy/upload or otherwise convert the recorded content. The user simply shares a link with another user and the content can be watched on the device of the receiving user's choice. The process eliminates user intervention and provides an opportunity for content creators and subscription services to attract new customers and/or place revenue generating advertisements into the shared content.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology is used to describe certain features of one or more embodiments of the invention.

The term "paid streaming source" refers to any of the online digital streaming services, such as, for example, Netflix, Hulu, HBO, etc.

The term "multimedia content" refers to any video or other content that is recorded by the user.

Various embodiments provide a System for socialized multimedia content Sharing. One embodiment of the present invention provides a System for socialized multimedia content Sharing. In another embodiment, there is provided a method for using the system. The system and method will now be disclosed in detail.

Referring now to FIG. 1, there is shown a diagram of a system for socialized media content sharing, according to one embodiment of the present invention. As can be seen, a sending user (the sender) can use a smart phone, computer, or any smart device to send links to multimedia content that they have stored or selected from a list that the sender has populated or received from other senders. When the send wants to share particular content with another, the receiver, the sender selects the multimedia content, then the sender selects one or more than one receiver to allow access to the content. For example, if the sender recorded a particular sporting event or program and knows that a friend wanted to watch the event, but could not for some reason. The sender can select the multimedia content recording from their DVR and send a link to that multimedia content recording to the receiver. Once the receiver has the link, the receiver can access the multimedia content directly from the senders DVR. As will be understood by those with skill in the art with reference to this document, the video from the DVR could automatically be uploaded to a secure cloud based storage and viewed from that location.

Additionally, the sender could send a link from a subscribed streaming content provider to the one or more than one receiver so that the receiver can view that content as well. The sender can see the content icon and select it and send that to one or more than one receiving user's inbox. A sent content icon would be in the one or more than one receiving user's inbox. The receiving user just needs to click on the content icon to start viewing the content. For receivers that do not subscribe to the streaming or other content providers offerings, the receiver can be authorized a trial subscription to the service to watch the content send by the sender. This gives the providers and opportunity to expand their user base. The subscription service can offer special discounts to both the sender and the receiver for the referral. This enables the receiver to view the content and potentially subscribe, making this invention a positive marketing tool for the subscription service and the sender and receiver as well.

Figure 2:
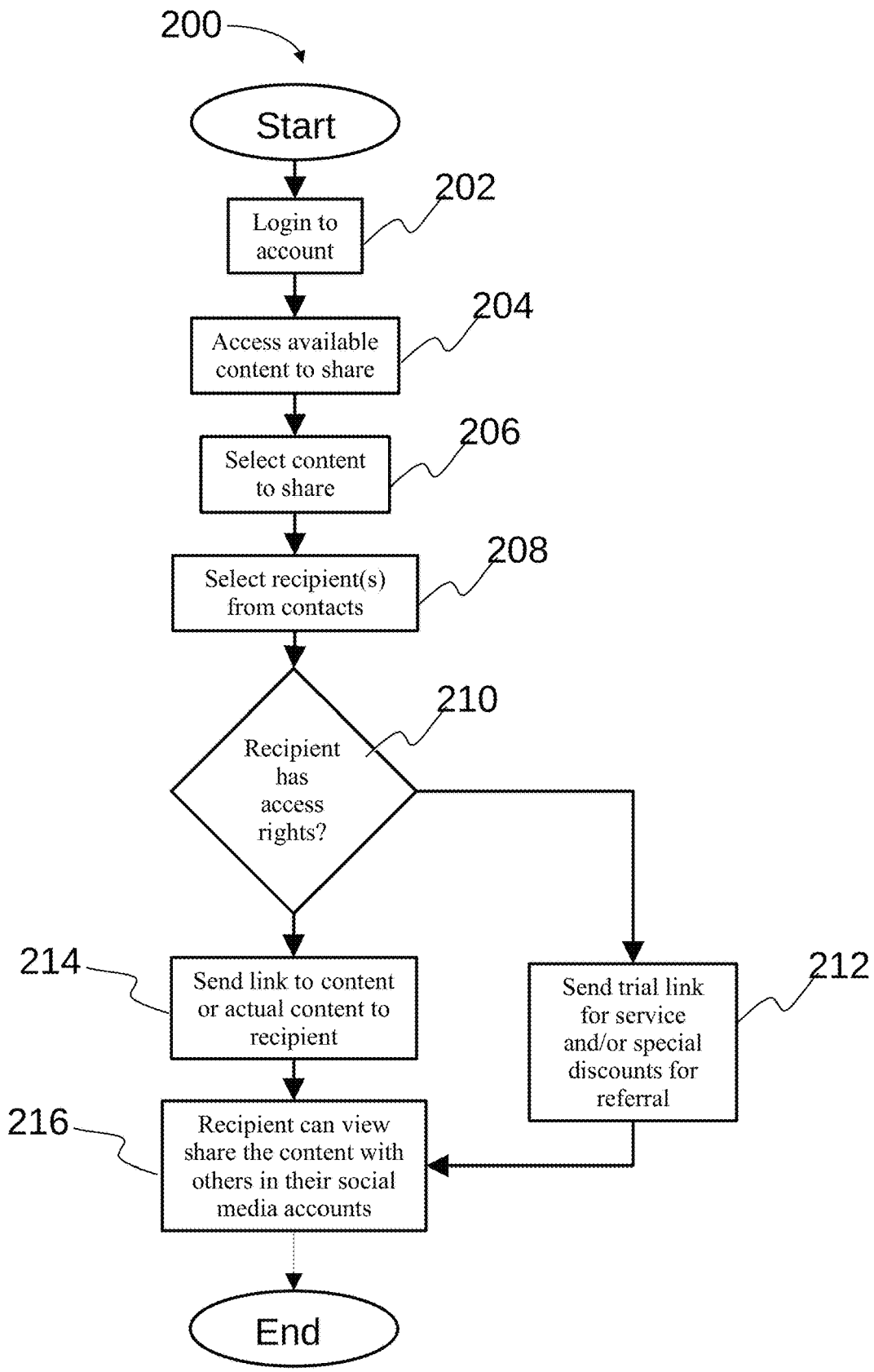
FIG. 2 is a flow chart diagram of some steps of a method for using the system of FIG. 1.

In another aspect of the present invention, in order for the invention to work correctly, any physical recording device, such as, for example, a digital video recorder (DVR) will have to be connected to the Internet and have the capacity to accept instructions from a remote application for operating the recording device by a remote user. This would enable the Referring now to FIG. 2, there is a flow chart diagram of some steps of a method for using the system. First, the sender logs onto their account. Then, the sender accesses the multimedia content that they want to share. Next, the sender selects one or more than one piece of multimedia content to share. Then, one or more than one receiver is selected from the senders contact list. Next, the invention determines if the receiver is a subscriber to the selected multimedia content service or if the multimedia content is available for free. If the receiver is a subscriber or the multimedia content is freely available, the link to the actual multimedia content is sent. If the receive is not a subscriber, then the link is automatically modified to support a trial to the subscription service with any special offers for the receiver. Optionally, if the receiver subscribes to the service, the sender can also be incentivize by the subscription service for sending the link and adding a new subscriber to the service. Finally, the recipient can view the multimedia content.

What has been described is a new and improved system for a system for socialized media content sharing, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A system for socialized media content sharing, the system comprising:
   a) a sending device used by a user;
   b) one or more than one link to multimedia content stored in a storage operably connected to the sending device;
   c) instructions operable on the sending device for:
      1) Displaying a list of the one or more than one link stored in the storage;
      2) Selecting one or more than one link from the displayed list;
      3) Displaying a list of the one or more than one recipients;
      4) Selecting one or more recipient to transmit the one or more than one link;
      5) Transmitting the one or more than one link to the one or more than one selected recipient;
      6) Displaying one or more than one linked multimedia content from the storage to the recipient
      7) Sending a video clip instead of the entire multimedia content;
      8) Blocking a receiver from receiving one or more than one link;
      9) Creating a QR code to upload a receiver's information to be used; and
      10) displaying advertisements prior to playing one one or more than one multimedia content.

2. The system of claim 1, wherein the sending device is selected from the group consisting of a smart phone, a computer, a digital video recorder, a cloud digital video recorder, a cloud storage, a tablet, or a smart device connected to the Internet.

3. The system of claim 1, wherein the one or more than one link is selected from a list that the user has populated or received from one or more than one different sending device.

4. The system of claim 1, wherein to share particular content with another receiver, the user selects the multimedia content, then the user selects one or more than one receiver to allow access to the content.

5. The system of claim 1, wherein the one or more than one link stored in the storage is an event recorded by the user on a digital video recorder.

6. The system of claim 1, wherein the one or more than one link stored in the storage is an event recorded by the user from a paid streaming source.

7. The system of claim 1, wherein the one or more than one link stored in the storage is an event from a paid streaming account associated with the user.

8. The system of claim 1, further comprising instructions for automatically uploading the multimedia content video from the DVR could automatically be to a secure cloud based storage and viewed from that location.

9. The system of claim 1, wherein the step of transmitting the one or more than one link to the one or more than one selected recipient is performed using a social media platform.

10. The system of claim 1, wherein the step of transmitting the one or more than one link to the one or more than one selected recipient is performed using an electronic communications platform.

11. The system of claim 1, wherein if the recipient that do not subscribe to a streaming service or other content providers offerings, the recipient is authorized a trial subscription to the service to watch the received content.

12. The system of claim 2, wherein the sending device is connected to the Internet and can accept instructions from a remote application for operating the sending device by a remote user.

13. A method for using a system for socialized media content sharing, the method comprising the steps of:
   a) logging into a sending account;
   b) accessioning multimedia content to share;
   c) selecting one or more than one piece of multimedia content to share;
   d) selecting one or more than one receiver is selected from a contact list stored in the sending account;
   e) determining if the receiver is a subscriber to the selected multimedia content service or if the multimedia content is available for free;
   f) viewing the multimedia content by the recipient;
   g) sending a video clip instead of the entire multimedia content;
   h) blocking a receiver from receiving one or more than one link;
   i) creating a QR code to upload a receiver's information to be used; and
   j) displaying advertisements prior to playing one one or more than one multimedia content.

14. The method of claim 13, further comprising the step of sending a link to the multimedia content if the receiver is a subscriber to the service containing the multimedia content.

15. The method of claim 13, further comprising the step of sending a link to the actual multimedia content if the multimedia content is freely available.

16. The method of claim 13, further comprising the step of automatically modifying the link to support a trial to the subscription service with any special offers for the receiver, if the receive is not a subscriber.

17. The method of claim 16, further comprising the step of incentivizing the user, by the subscription service, if the receiver subscribes to the service.

18. The method of claim 16, further comprising the step of displaying advertisements prior to playing the linked content.

* * * * *